J. POKORNY.
RAT AND MOUSE TRAP.
APPLICATION FILED SEPT. 23, 1919.
1,333,875.                               Patented Mar. 16, 1920.
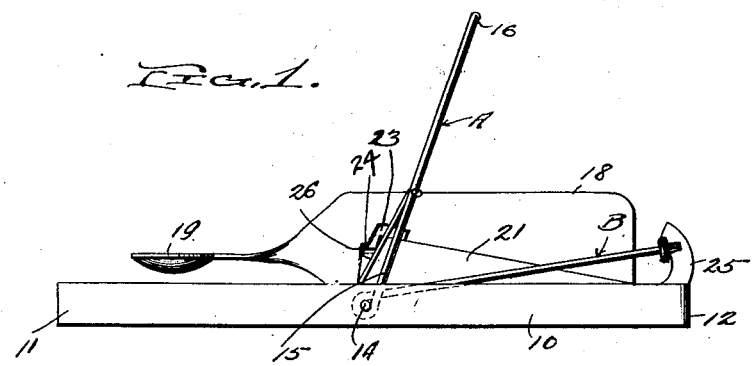
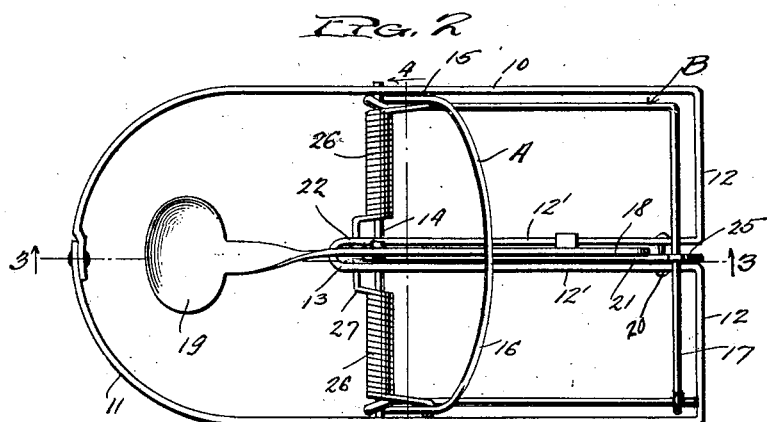
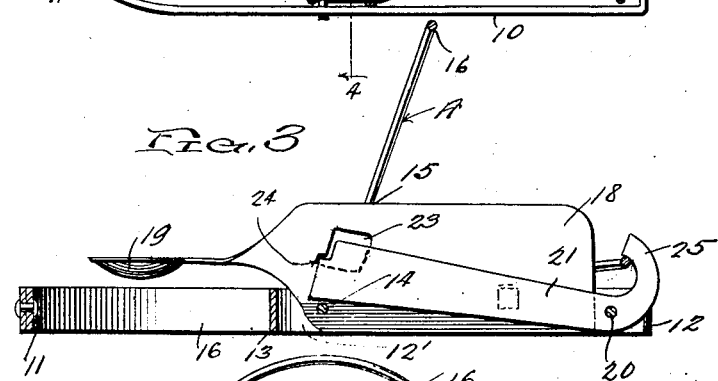
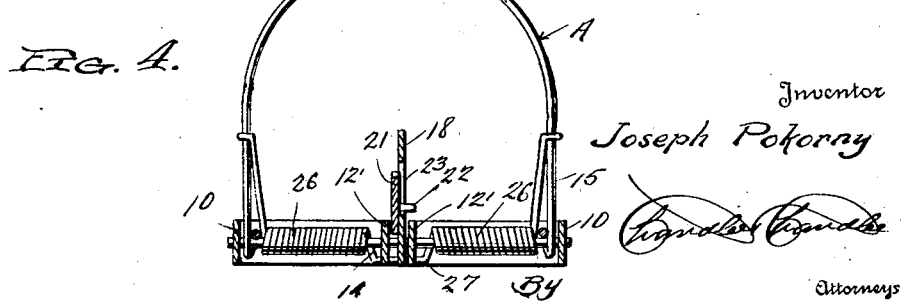
Inventor
Joseph Pokorny
Attorneys

UNITED STATES PATENT OFFICE.

JOSEPH POKORNY, OF SHAMROCK, TEXAS.

RAT AND MOUSE TRAP.

1,333,875.  Specification of Letters Patent.  Patented Mar. 16, 1920.

Application filed September 23, 1919. Serial No. 325,746.

*To all whom it may concern:*

Be it known that I, JOSEPH POKORNY, a citizen of the United States, residing at Shamrock, in the county of Wheeler, State of Texas, have invented certain new and useful Improvements in Rat and Mouse Traps; and I do hereby declare the following to be a full, clear, and exact description of the invention, such as will enable others skilled in the art to which it appertains to make and use the same.

This invention relates to new and useful improvements in traps and particularly to rat and mouse traps.

One object of the present invention is to provide a novel and improved trap in which it is unnecessary to touch the choker wire while setting the trap.

Another object is to provide a novel and improved trip and detent which is positive in its action to hold the choker wire but which is easily and quickly released upon depression of the bait pan.

Other objects and advantages will be apparent from the following description when taken in connection with the accompanying drawing.

In the drawing:

Figure 1 is a side elevation of the trap in set position.

Fig. 2 is a top plan view of the same.

Fig. 3 is a vertical longitudinal sectional view taken on the line 3—3 of Fig. 2, at one side of the central trip and detent.

Fig. 4 is a vertical transverse sectional view taken on the line 4—4 of Fig. 2, through the detent and supporting means therefor.

Referring particularly to the accompanying drawing, there is shown a frame formed from a single length of metal and including the parallel side portions 10, connected at one end by the curved portion 11, and the straight transverse portions 12, at the other end. The inner ends of the portions 12 are bent at right angles and extended centrally between and parallel to the side portions 10, at 12', to a point adjacent the junction of the side portions and the curved portion, where they are connected by a curved bight portion 13. Disposed transversely through the side members and the inner bent portions is a shaft 14 around the end portions of which, inwardly of the side portions 10, are looped the intermediate portions of the side members of the double yoke 15. This yoke includes the portions A and B, as shown, the former being rounded as shown at 16, while the other is provided with a transverse straight bar 17. The curved or rounded part of the member A is arranged to coöperate with the curved portion of the frame to kill the animal whose head is caught therebetween. Disposed between the portions 12', and mounted on the shaft 14, as the pivot thereof, is a plate 18, one end of which is twisted and extends into the curved portion 11 where it is formed into a bait pan 19. Through the members 12', adjacent their junction with the members 12, there is disposed a pivot pin 20, and mounted on this pivot pin, between the members 12', is a plate 21 which extends to a point adjacent the other or connected ends of the said members. Struck out of the said end of the plate 21 is a lug 22 which engages through an opening 23 formed in the adjacent portion of the plate 18. In the lower forward corner of this opening 23 there is formed an angular notch 24 in which is received the said lug 22, when the trap is in set position, as will be more clearly explained hereinafter. The outer end of the plate 21 is formed with an upwardly directed hook 25 with which the angular portion of the double yoke is arranged to engage when the trap is set. Coiled around the shaft 14, at each side of the members 12', are portions of a coil spring 26, the outer ends of which are engaged with the side portions of the round part of the yoke, while the intermediate portion of the spring is formed with a yoke 27 which is engaged with the lower portions of the members 12'. The tendency of the spring is to swing the double yoke on the shaft 14 and dispose its rounded portion against the curved portion of the frame of the trap.

To set the trap the bar 17 of the double yoke is grasped in one hand of the operator while the other hand holds the frame of the trap, the yoke being swung on its pivot, against the tension of the spring 26 until said bar snaps into engagement with the hook 25 of the plate 21. This rocks the plate 21 on its pivot and causes the lug 22 to engage against the upper wall of the notch 24. This securely holds the yoke with its rounded member in elevated position and ready to descend against the frame when released by downward pressure on the bait pan by an animal. When the bait pan is depressed the plate 18 will be rocked on its pivot to such a degree that the lug will be freed from the notch and permitted to move upwardly in the large opening 23, with the result that the hook will be moved, by the rocking of the plate 21, out of engagement with the bar 17, and the spring 26 permitted to exert its force to swing the double yoke and catch the head of the animal between the rounded portion of the yoke and the curved portion of the frame.

It will thus be seen that in setting the trap it is not necessary to touch, with the hands, the portions of the trap which come into contact with the animal. Furthermore, this portion which engages with the hook 25 serves as a handle by means of which the choker yoke is moved into set position. Also, it will be noted that when the lug 22 is engaged in the small notch of the plate 21, the plate will be securely held against disengagement from the bar 17 of the choker yoke, thereby obviating danger of the person who is setting the trap being caught by any premature springing of the trap. In fact, by the construction hereinbefore set forth, premature springing of the trap is rendered impossible, provided the bait pan is not moved.

What is claimed is:

1. An animal trap including a frame, a choker movably mounted in the frame and resiliently urged toward closed position, a member pivotally mounted in the frame and having an opening formed with a notch in one wall, a bait pan forming a part of the said member, a detent having a hook for engagement with a portion of the choker and a lug for engagement in the notch at times to hold the choker in set position and movable in the opening to release the choker, and means forming a part of the frame of the trap for supporting the mechanism.

2. An animal trap comprising a frame having the central portions of one end directed inwardly between the sides of the frame and in parallel relation to each other and to the said sides, a vertical elongated plate disposed between said parallel portions and pivoted to said portions at the inner end thereof, a bait pan on the inner end of the said plate, and a detent pivotally mounted in the other ends of the parallel portions and formed for releasable engagement with the elongated plate, and a double yoke mounted in the frame, said detent being arranged to engage with the yoke simultaneously with its engagement with the elongated plate.

In testimony whereof, I affix my signature, in the presence of two witnesses.

JOSEPH POKORNY.

Witnesses:
PAUL MACINA,
JOHN HRNCIAR.